(12) United States Patent
Tang et al.

(10) Patent No.: US 11,910,085 B2
(45) Date of Patent: Feb. 20, 2024

(54) IMAGING DEVICE AND CAMERA HAVING NIGHT VISION MODE

(71) Applicant: SAVANT TECHNOLOGIES LLC, East Cleveland, OH (US)

(72) Inventors: Fangru Tang, Shanghai (CN); Yanlin Xu, Shanghai (CN); Dong Xing, Shanghai (CN); Hongbin Xu, Shanghai (CN); Zhiyong Wang, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 110 days.

(21) Appl. No.: 17/542,288

(22) Filed: Dec. 3, 2021

(65) Prior Publication Data

US 2022/0182545 A1　Jun. 9, 2022

(30) Foreign Application Priority Data

Dec. 4, 2020　(CN) .......................... 202022881008.7

(51) Int. Cl.
*H04N 23/667*　(2023.01)
*H04N 23/51*　(2023.01)
*H04N 23/55*　(2023.01)
*H04N 23/56*　(2023.01)
*H04R 1/08*　(2006.01)
*H04R 3/00*　(2006.01)
*G03B 11/04*　(2021.01)
*G03B 17/12*　(2021.01)
*H04R 1/02*　(2006.01)

(52) U.S. Cl.
CPC ........... *H04N 23/667* (2023.01); *G03B 11/04* (2013.01); *G03B 17/12* (2013.01); *H04N 23/51* (2023.01); *H04N 23/55* (2023.01); *H04N 23/56* (2023.01); *H04R 1/028* (2013.01); *H04R 1/08* (2013.01); *H04R 3/00* (2013.01); *H04R 2499/11* (2013.01)

(58) Field of Classification Search
CPC ...... H04N 23/667; H04N 23/51; H04N 23/56; H04N 23/55; G03B 11/04; G03B 17/12
See application file for complete search history.

(56) References Cited

U.S. PATENT DOCUMENTS 10,930,126 B1 * 2/2021 Jeong ................... H04N 23/611
2008/0143868 A1 * 6/2008 Tsuchiya .................. G03B 7/00
　　　　　　　　　　　　　　　　　　　　348/360

(Continued)

FOREIGN PATENT DOCUMENTS

CN　　205407975 U　*　7/2016
CN　　205407975 U　　　7/2016

*Primary Examiner* — Rowina J Cattungal
(74) *Attorney, Agent, or Firm* — WOOD IP LLC

(57) ABSTRACT

The present disclosure relates to an imaging device having a night vision mode. The imaging device has a lens being capable of perform imaging according to received light and an infrared LED being capable of emitting infrared light as a light source for the lens in a night vision mode, both being controlled by a control circuit. The lens is allowed to perform imaging when the control circuit is turned on, and the lens is prohibited from performing imaging when the control circuit is turned off. The imaging device also has a switch and a baffle, the position of which triggers the switch to turn on and off the control circuit. The imaging device provides privacy protection and avoids the reduction of the lifespan of the infrared LED.

18 Claims, 6 Drawing Sheets

(56) References Cited

U.S. PATENT DOCUMENTS

| | | | |
|---|---|---|---|
| 2019/0098725 A1* | 3/2019 | Sadwick | F21S 2/00 |
| 2020/0288045 A1* | 9/2020 | Jeong | H04N 7/186 |
| 2021/0294081 A1* | 9/2021 | Wang | G02B 13/14 |
| 2021/0368139 A1* | 11/2021 | Ishida | G08B 21/0476 |

* cited by examiner

IMAGING DEVICE AND CAMERA HAVING NIGHT VISION MODE

TECHNICAL FIELD

The present disclosure relates to the field of cameras. In particular, the present disclosure relates to an imaging device and a camera having a night vision mode.

BACKGROUND

In daily life, cameras are used more and more widely, and especially in order to prevent theft or for a monitoring purpose, home network cameras are also increasingly common these days. Cameras bring convenience to people's lives, but also have risks of exposing people's privacy.

In order to protect privacy, a camera having a privacy protection function as shown in FIG. 1 has been proposed in the prior art.

As shown in (A) of FIG. 1, when the camera works normally, a small baffle 1 made of an opaque material is located below lens L to expose lens L. As shown in (B) of FIG. 1, when privacy protection is required, the small baffle 1 is moved upward to block lens L. The small baffle 1 is separated from an infrared transmitting cover 2 in front of an infrared LED of the camera. This design results in an increase in the number of components, and destroys the integrity of the industrial design, thus affecting the aesthetic appearance of the camera.

In addition, as shown in (B) of FIG. 1, when the small baffle 1 blocks lens L of the camera, lens L cannot receive visible light from the outside, and the camera enters a night vision mode, i.e. the infrared LED of the camera would be automatically opened to emit infrared light to a person or article, etc. around the camera. However, since lens L has been blocked by the small baffle 1 made of an opaque material, infrared light reflected by the person or article, etc. outside cannot be received by lens L. In this case, light emitted from the infrared LED is completely wasted and would not play any role, which greatly reduces the lifespan of the infrared LED.

Moreover, in the camera shown in FIG. 1, although blocking lens L by means of the small baffle 1 may protect privacy to a certain extent, at this time, audio input is not cut off, and the privacy may still be exposed.

SUMMARY

In view of this, the present disclosure provides an imaging device and a camera having a night vision mode, so as to at least solve the problems in the prior art that the privacy cannot be protected thoroughly and the lifespan of the infrared LED is reduced, and also achieve the aesthetic appearance of the imaging device or camera.

According to an embodiment of the present disclosure, there is provided an imaging device, comprising a main body, the main body comprising a panel; a lens exposed from the panel and configured to perform imaging according to received light; at least one infrared LED, the at least one infrared LED being provided around the lens and exposed from the panel; a control circuit configured to control imaging of the lens and light emission of the at least one infrared LED, wherein the lens is allowed to perform imaging when the control circuit is turned on, and the lens is prohibited from performing imaging when the control circuit is turned off, and the at least one infrared LED is allowed to emit infrared light if the amount of visible light received by the lens is less than a predetermined value when the control circuit is turned on, and the at least one infrared LED is prohibited from emitting infrared light if the amount of visible light received by the lens is less than a predetermined value when the control circuit is turned off; a switch provided in the control circuit and configured to turn on or turn off the control circuit; and a baffle provided on the main body, the baffle being configured to be capable of transmitting infrared light emitted from the at least one infrared LED, and the baffle being configured to move between a first position and a second position, wherein in the first position, the baffle is capable of transmitting infrared light emitted from the at least one infrared LED and exposing the lens, and the baffle triggers the switch to cause the switch to turn on the control circuit, and in the second position, the baffle blocks the lens and triggers the switch to cause the switch to turn off the control circuit.

According to the imaging device of the present disclosure, for an imaging device in a working state, when the baffle is moved to the second position, the control circuit of the imaging device may be turned off by triggering the switch, so that the imaging device stops working, thereby thoroughly enabling the imaging device to enter a privacy protection mode, and also avoiding the reduction of the lifespan of the infrared LED caused by unnecessary light emission. In addition, the baffle as a whole can transmit infrared light, which improves the aesthetic appearance of the imaging device.

In an embodiment of the imaging device according to the present disclosure, the imaging device further comprises an audio acquisition device configured to acquire sound around the imaging device, the control circuit is further configured to control the audio acquisition device to allow the audio acquisition device to acquire the sound when the control circuit is turned on, and to prohibit the audio acquisition device from acquiring the sound when the control circuit is turned off, and the control circuit allows the audio acquisition device to acquire the sound when the baffle is in the first position, and prohibits the audio acquisition device from acquiring the sound when the baffle is in the second position.

For an imaging device capable of acquiring audio at the same time, turning off the control circuit to prohibit acquisition of audio by the audio acquisition device avoids audio leakage during a privacy protection process.

In an embodiment of the imaging device according to the present disclosure, guide rails are provided on two sides of the panel on the main body, and the baffle moves between the first position and the second position by means of the guide rails.

By providing the guide rails, the baffle is easily movable on the main body, which brings convenience to the user.

In an embodiment of the imaging device according to the present disclosure, the panel is provided with an indicator light for indicating a working state of the imaging device, the baffle is provided with a central opening at the central portion and is provided with a through hole at the top, and when the baffle is in the first position, the lens is exposed from the central opening of the baffle, the indicator light is exposed from the through hole, and when the baffle is in the second position, the indicator light is exposed from the central opening of the baffle.

By observing the indicator light, the working state of the imaging device can be easily learned.

In an embodiment of the imaging device according to the present disclosure, the panel is provided with an imaging device icon, and when the baffle is in the first position, the imaging device icon is blocked by the baffle, and when the baffle is in the second position, the imaging device icon is exposed to indicate that the imaging device stops working.

By observing the imaging device icon, it is possible to assist in determining whether the imaging device stops working.

In an embodiment of the imaging device according to the present disclosure, the at least one infrared LED is configured to be capable of emitting infrared light if the amount of visible light received by the lens is less than a predetermined value.

If the amount of visible light received by the lens is less than a predetermined value, the imaging device may enter a night vision mode.

According to an embodiment of the present disclosure, there is provided a camera having a night vision mode, comprising a lens configured to acquire an image of an object within an imaging range of the camera; at least one infrared LED provided around the lens, the at least one infrared LED being configured to be capable of emitting infrared light in a night vision mode, the infrared light being received by the lens after being reflected by the object; a main control circuit configured to control acquisition of the image by the lens and light emission of the at least one infrared LED; a switch provided in the main control circuit and configured to turn on or turn off the main control circuit, so that the main control circuit allows the lens to acquire the image and allows the at least one infrared LED in a night vision mode to emit infrared light when the main control circuit is turned on, and prohibits the lens from acquiring the image and prohibits the at least one infrared LED in a night vision mode from emitting infrared light when the main control circuit is turned off; a housing having an opening and configured to accommodate the lens, the main control circuit, the switch, and the at least one infrared LED; and a baffle made of an infrared transmitting material, engaged with the opening of the housing and movable over the opening of the housing to cover or expose the opening, wherein a switch triggering component is provided on a face of the baffle on which the baffle is engaged with the opening, and when the baffle moves over the opening of the housing to completely cover the opening, the switch triggering component triggers the switch to turn on the main control circuit, and when the baffle moves over the opening of the housing to expose the opening and block the lens, the switch triggering component triggers the switch to turn off the main control circuit.

According to the camera having a night vision mode of the present disclosure, for a camera in a working state, when the baffle is moved over the opening of the housing to expose the opening and block the lens, the main control circuit of the camera may be turned off by means of the switch triggering component, so that the camera stops working, thereby thoroughly entering a privacy protection mode, and also avoiding the reduction of the lifespan of the infrared LED caused by unnecessary light emission. In addition, the baffle as a whole is made of an infrared transmitting material, which improves the aesthetic appearance of the camera.

In an embodiment of the camera having a night vision mode according to the present disclosure, the camera further comprises an audio capturing device configured to capture sound around the camera, wherein the main control circuit is further configured to control capturing of the sound by the audio capturing device, the main control circuit allows the audio capturing device to capture the sound when the main control circuit is turned on, and prohibits the audio capturing device from capturing the sound when the main control circuit is turned off, and the audio capturing device is accommodated in the housing.

The camera having a night vision mode according to the present disclosure not only can perform imaging, but also can capture sound. Since the audio capturing device is also controlled by the main control circuit, when the main control circuit is turned off, the audio capturing device likewise stops working, thereby avoiding audio leakage, and achieving thorough privacy protection.

In an embodiment of the camera having a night vision mode according to the present disclosure, the camera further comprises a panel, a lens, a switch and at least one infrared LED exposed from the panel, the panel is provided with an indicator light for indicating a working state of the camera, the baffle is provided with a central opening at the central portion and is provided with a through hole at the top, and when the baffle moves over the opening of the housing to completely cover the opening of the housing, the lens is exposed from the central opening of the baffle, and the indicator light is exposed from the through hole.

By observing the indicator light, the working state of the camera can be easily learned.

In an embodiment of the camera having a night vision mode according to the present disclosure, the camera further comprises guide rails provided on two sides of the housing along the opening, and the baffle moving over the opening of the housing comprises: the baffle sliding along the guide rails over the opening of the housing.

By providing the guide rails, the baffle is easily movable on the housing, which brings convenience to the user.

In an embodiment of the camera having a night vision mode according to the present disclosure, the panel is provided with a camera icon, and when the baffle slides along the guide rails to block the lens, the switch triggering component triggers the switch to turn off the main control circuit, and the camera icon is exposed from the opening to indicate that the camera stops working.

By observing the imaging device icon, it is possible to assist in determining whether the imaging device stops working.

In an embodiment of the camera having a night vision mode according to the present disclosure, the switch has a protruding portion, the switch triggering component has a recessed portion fitting the protruding portion, and when the recessed portion is engaged with the protruding portion, the switch triggering component drives the switch to move along with the movement of the baffle, so as to turn on or turn off the main control circuit.

By the engagement of the protruding portion of the switch with the recessed portion of the switch triggering component, the control circuit is turned on or turned off by means of a simple structure.

In an embodiment of the camera having a night vision mode according to the present disclosure, the panel is yellow-orange or has another color having a warning function.

The panel is set to be yellow-orange or have another color having a warning function, so that the working state of the camera can be easily determined on the basis of the color.

According to an embodiment of the present disclosure, there is provided a camera having a night vision mode, comprising a lens, an infrared emitting part and a switch triggering component; and a baffle having an opening, the baffle being configured to move between a first position, a second position, and a third position, wherein when the baffle is in the first position, the baffle blocks the infrared emitting part, the lens is exposed from the opening, when the baffle is in the second position, the baffle blocks the infrared emitting part and the lens, and when the baffle is in the third position, the baffle blocks the infrared emitting part and the lens and triggers the switch triggering component to enable the camera to be in an electrically turned-off state.

According to the camera having a night vision mode of the present disclosure, when the baffle is in the third position, the camera is enabled to be in an electrically turned-off state by means of the switch triggering component, and the camera stops working, thereby thoroughly entering a privacy protection mode, and also avoiding the reduction of the lifespan of the infrared LED caused by unnecessary light emission.

In an embodiment of the camera having a night vision mode according to the present disclosure, the infrared emitting part is at least one infrared LED, and the baffle is capable of transmitting infrared light.

The baffle as a whole can transmit infrared light, which improves the aesthetic appearance of the camera.

In an embodiment of the camera having a night vision mode according to the present disclosure, the baffle is a slider mounted on the camera, and the slider is configured to slide between the first position, the second position and the third position.

The use of a baffle in the form of a slider facilitates the operation of the user.

In an embodiment of the camera having a night vision mode according to the present disclosure, when the baffle is in the first position, the lens is configured to receive visible or infrared light.

When the baffle is in the second position, the infrared emitting part emits infrared light, and the lens is configured to receive the reflected infrared light transmitted through the baffle, so that the camera enters a night vision mode The camera may be switched to different modes by means of the movement of the baffle between different positions.

BRIEF DESCRIPTION OF THE DRAWINGS

The drawings illustrated herein, constituting a part of the present disclosure, are used for providing further understanding of the present disclosure, and the illustrative embodiments and illustrations thereof are used for explaining the present disclosure, but not constituting inappropriate limitation on the present disclosure. In the drawings.

REFERENCE SIGNS

1: small baffle;
2: infrared transmitting cover;
L: lens;
200: imaging device;
201: main body;
2011: panel;
202: lens
203, 303: at least one infrared LED;
204: control circuit;
2041: switch;
205: baffle;
300: camera;
301: housing;
302: lens
304: switch
305: panel;
306: baffle;
3061: central opening;
3062: through hole;
307: indicator light;
308: camera icon;
401: switch triggering component.

DETAILED DESCRIPTION OF THE EMBODIMENTS

For better understanding of the solutions of the present disclosure by a person skilled in the art, the technical solutions of the embodiments of the present disclosure will be described in a clear and complete manner in conjunction with the drawings related to the embodiments of the present disclosure. Obviously, the following embodiments are merely a part of, rather than all of, the embodiments of the present disclosure, and based on these embodiments, a person skilled in the art may obtain the other embodiments without any creative effort, which also fall within the scope of the present disclosure.

Figure 1:
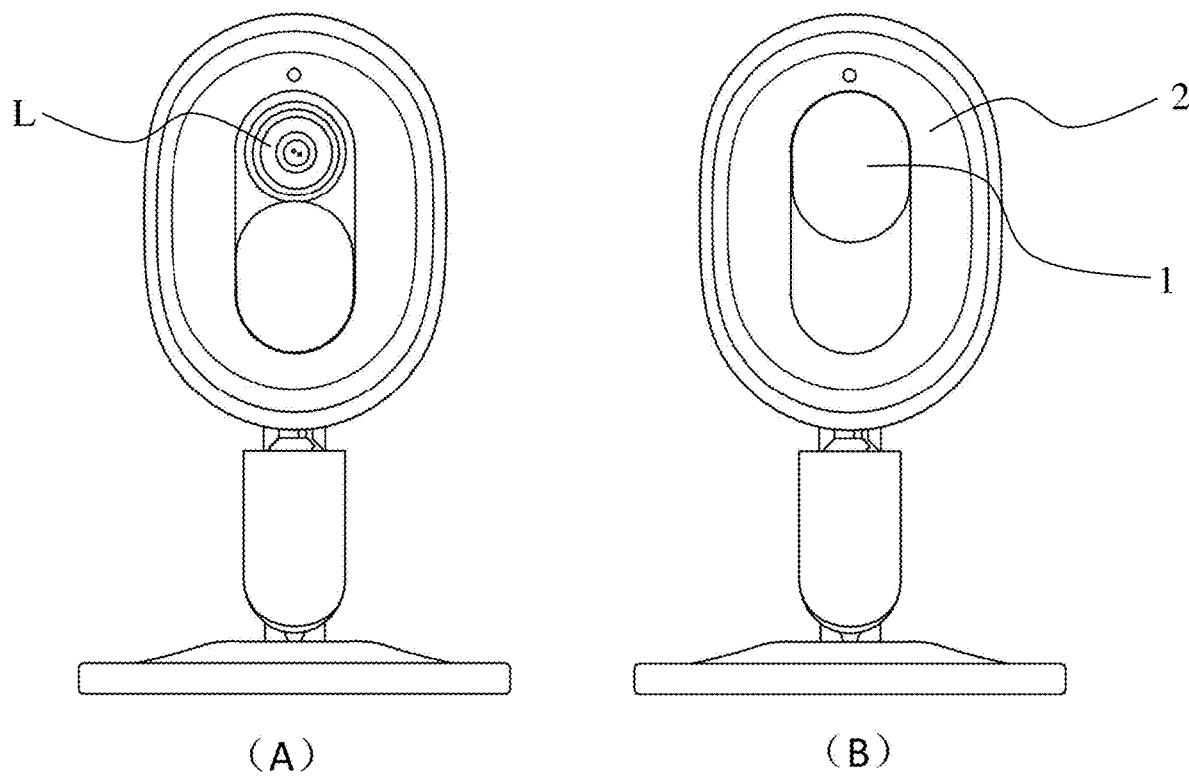
FIG. 1 is a diagram of a camera having a privacy protection function in the prior art.
Figure 2:
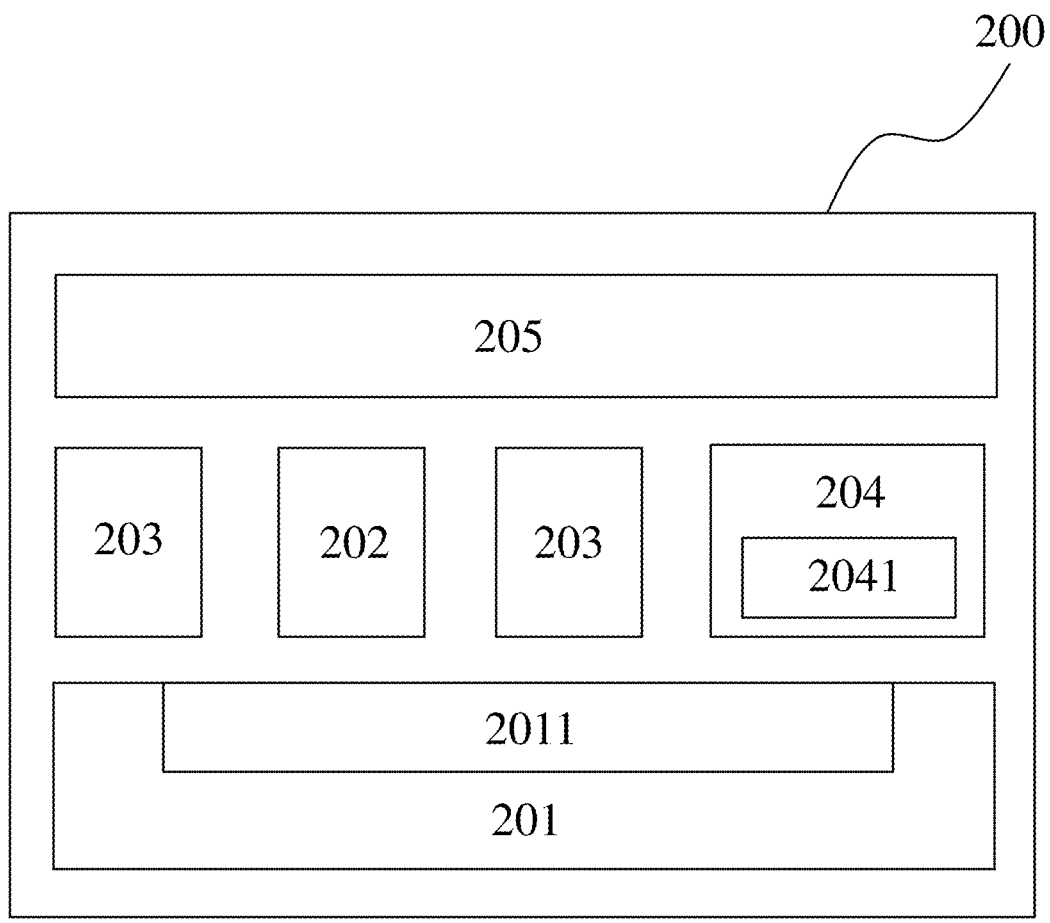
FIG. 2 is a block diagram of an imaging device according to an exemplary embodiment of the present disclosure.

According to an embodiment of the present disclosure, there is provided an imaging device. FIG. 2 is a block diagram of an imaging device according to an embodiment of the present disclosure.

Referring to FIG. 2, an imaging device 200 according to an embodiment of the present disclosure comprises a main body 201, a lens 202, at least one infrared LED 203, a control circuit 204, a switch 2041, and a baffle 205.

The main body 201 comprises a panel 2011, the main body 201 may be a housing of the imaging device 200, and the panel 2011 is provided in the housing.

The lens 202 is provided in the housing, is exposed from an opening on the panel 2011, and is configured to perform imaging according to received light.

The at least one infrared LED 203 is provided around the lens 202 and is exposed from the opening on the panel 2011. If the amount of visible light received by the lens 202 is less than a predetermined value, for example, in a dark environment, when the lens 202 cannot receive visible light at all or can only receive a small amount of visible light, the at least one infrared LED 203 may be controlled to emit infrared light to the outside. Infrared light emitted from the at least one infrared LED 203 may be reflected by an object, for example, a person or an article, within an imaging range of the imaging device, and the reflected infrared light is received by the lens 202, so that a black-and-white image may be generated.

The number of the at least one infrared LED 203 may be, for example, four, and four infrared LEDs are provided at equal intervals around the lens 202, however, the present disclosure is not limited thereto.

The control circuit 204 is provided in the housing of the imaging device 200, and may control imaging of the lens 202 and light emission of at least one infrared LED 203. For example, when the control circuit 204 is turned on, the lens 202 is allowed to image an object (for example, a person or an article) within an imaging range of the imaging device, and when the control circuit 204 is turned off, the lens 202 is prohibited from imaging an object within an imaging range of the imaging device; if the visible light received by the lens 202 is less than a predetermined value, for example, in cases where the lens 202 cannot receive visible light at all, when the control circuit 204 is turned on, the at least one infrared LED 203 is allowed to emit infrared light to the outside, and when the control circuit 204 is turned off, the at least one LED 203 is prohibited from emitting infrared light to the outside.

The switch 2041 is provided in the control circuit 204 for turning on the control circuit 204 or turning off the control circuit 204.

The baffle 205 is provided on the main body 201 to cover at least a portion of the panel 2011. The baffle 205 is made of an infrared transmitting material capable of transmitting infrared light. Infrared light emitted from the at least one infrared LED 203 may be transmitted through the baffle 205 to be emitted to the outside.

The baffle 205 is movable between a first position and a second position on the main body 201.

When the baffle 205 moves to the first position, the baffle 205 covers the at least one infrared LED 203 and exposes the lens 202. At this time, the baffle 205 triggers the switch 2041 to turn on the control circuit 204, so that the control circuit 204 controls the lens 202 and the at least one infrared LED 203 to work normally. For example, in cases where the control circuit 204 is turned on, if the lens 202 is capable of receiving an amount of visible light which is reflected by an object within an imaging range of the imaging device 200 and is greater than a predetermined value, the imaging device 200 is capable of acquiring a color image of the object ((for example, a person or an article)) within its imaging range, and if the amount of visible light received by the lens 202 is less than a predetermined value, the control circuit 204 controls the at least one infrared LED 203 to emit infrared light, infrared light emitted from the at least one infrared LED 203 irradiates the object within an imaging range of the imaging device 200, infrared light reflected by the object is received by the lens 202, and the imaging device 200 obtains a black-and-white image of the object within its imaging range.

The baffle 205 may be provided with a central opening at the central portion.

When the baffle 205 is in the first position, the lens 202 is exposed from the central opening of the baffle 205.

When the baffle 205 moves to the second position, the baffle 205 blocks the lens 202, for example, when the baffle 205 moves to the second position, the central opening of the baffle 205 is deviated from the lens 202, and the lens 202 thus is blocked by other portion of the baffle 205. At this time, the baffle 205 triggers the switch 2041 to cause the switch 2041 to turn off the control circuit 204. Since the control circuit 204 is turned off by the switch 2041, imaging of the lens 202 and light emission of the at least one infrared LED 203 are both prohibited, and the imaging device 200 stops working.

The imaging device 200 may also comprise an audio acquisition device (not shown in FIG. 2) for acquiring sound around the imaging device 200. The audio acquisition device is also controlled by the control circuit 204, for example, when the control circuit 204 is turned on, the audio acquisition device is allowed to acquire the sound around the imaging device 200, and when the control circuit 204 is turned off, the audio acquisition device is prohibited from acquiring the sound around the imaging device 200. That is, the control circuit 204 allows the audio acquisition device to acquire the sound around the imaging device 200 when the baffle 205 is in the first position, and prohibits the audio acquisition device from acquiring the sound around the imaging device 200 when the baffle 205 is in the second position.

In the present disclosure, the audio acquisition device may include, but is not limited to, a microphone, etc.

Guide rails are provided on two sides of the panel 2011 on the main body 201, and the baffle 205 is movable between the first position and the second position by means of the guide rails, however, the present disclosure is not limited thereto, and any manner capable of moving the baffle 205 between the first position and the second position will be applicable to the present disclosure.

The panel 2011 may be provided with an imaging device icon (not shown in FIG. 2), and when the baffle 205 is in the first position, the imaging device icon is located behind the baffle 205 and thus is blocked by the baffle 205. When the baffle 205 is in the second position, the imaging device icon is exposed to indicate that the imaging device stops working. By observing whether the imaging device icon of the imaging device is exposed, the state of the imaging device can be easily determined.

The panel 2011 may be provided with an indicator light (not shown in FIG. 2) for indicating a working state of the imaging device 2000. If the indicator light lights up, it is indicated that the imaging device 200 works normally, and if the indicator light goes out, it is indicated that the imaging device 200 stops working. The indicator light is also controlled by the control circuit 204. When the control circuit 204 is turned on, the indicator light lights up, and when the control circuit 204 is turned off, the indicator light goes out.

The baffle 205 may be provided with a through hole at the top. When the baffle 205 is in the first position, the lens 202 is exposed from the central opening of the baffle 205, and the indicator light is exposed from the through hole, and when the baffle 205 is in the second position, the lens 202 is blocked by the baffle, and the indicator light is exposed from the central opening of the baffle 205.

By observing the indicator light, the working state of the imaging device can be easily learned.

According to the imaging device of the present disclosure, for an imaging device in a working state, when the baffle is moved to the second position, the control circuit of the imaging device may be turned off by triggering the switch, so that the imaging device stops working, thereby thoroughly enabling the imaging device to enter a privacy protection mode, and also avoiding the reduction of the lifespan of the infrared LED caused by unnecessary light emission. In addition, the baffle as a whole can transmit infrared light, which improves the aesthetic appearance of the imaging device.

For better understanding of the present disclosure, how the imaging device achieves thorough privacy protection, avoids the reduction of the lifespan of the infrared LED, and achieves the aesthetic appearance of the imaging device will be described below in conjunction with a camera having a night vision mode as a specific application of the imaging device.

Figure 3A:
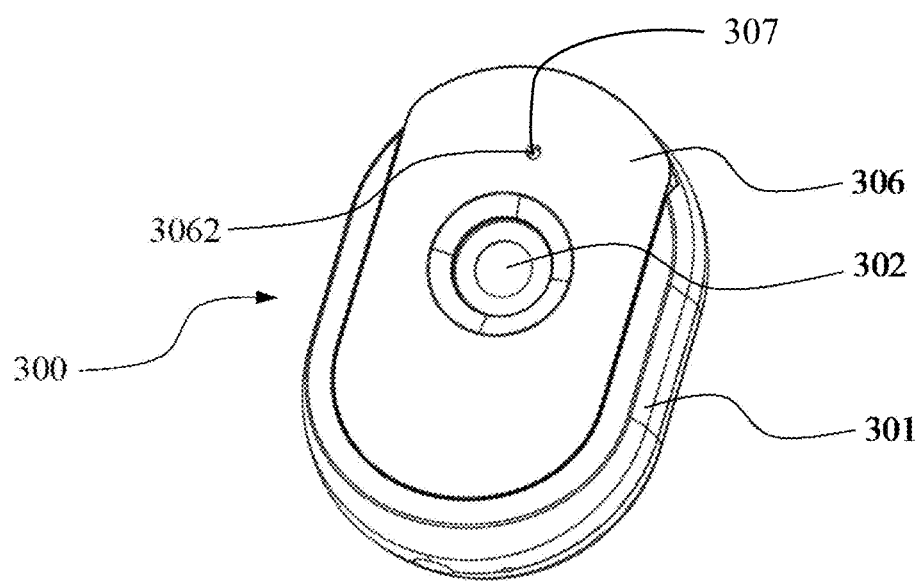
FIG. 3(A) is a perspective view of a camera having a night vision mode where a baffle is located at the bottom of a housing.
Figure 3B:
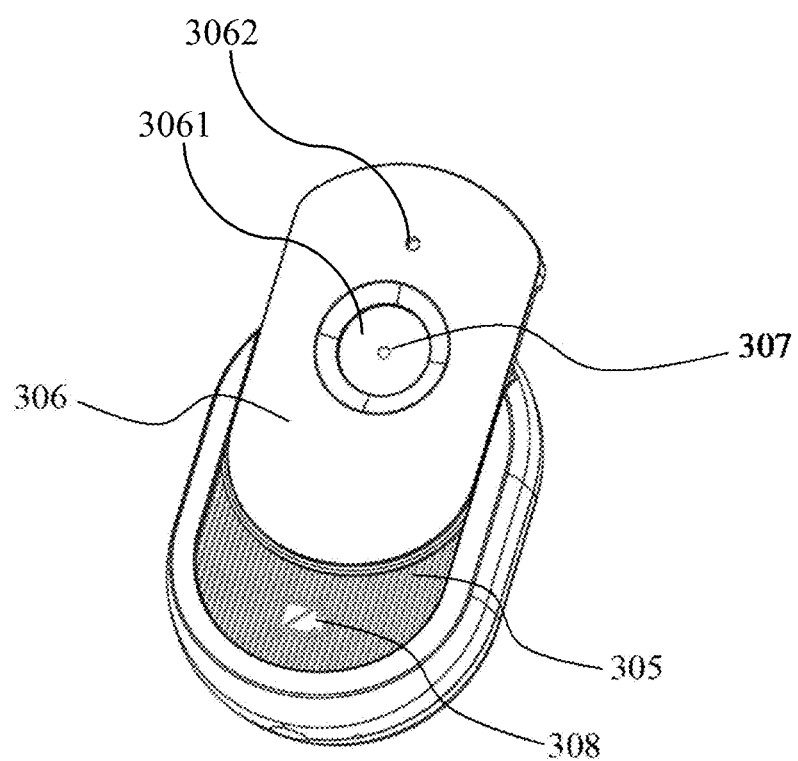
FIG. 3(B) is a perspective view of the camera of FIG. 3(A) where a baffle is located at the top of a housing.
Figure 3C:
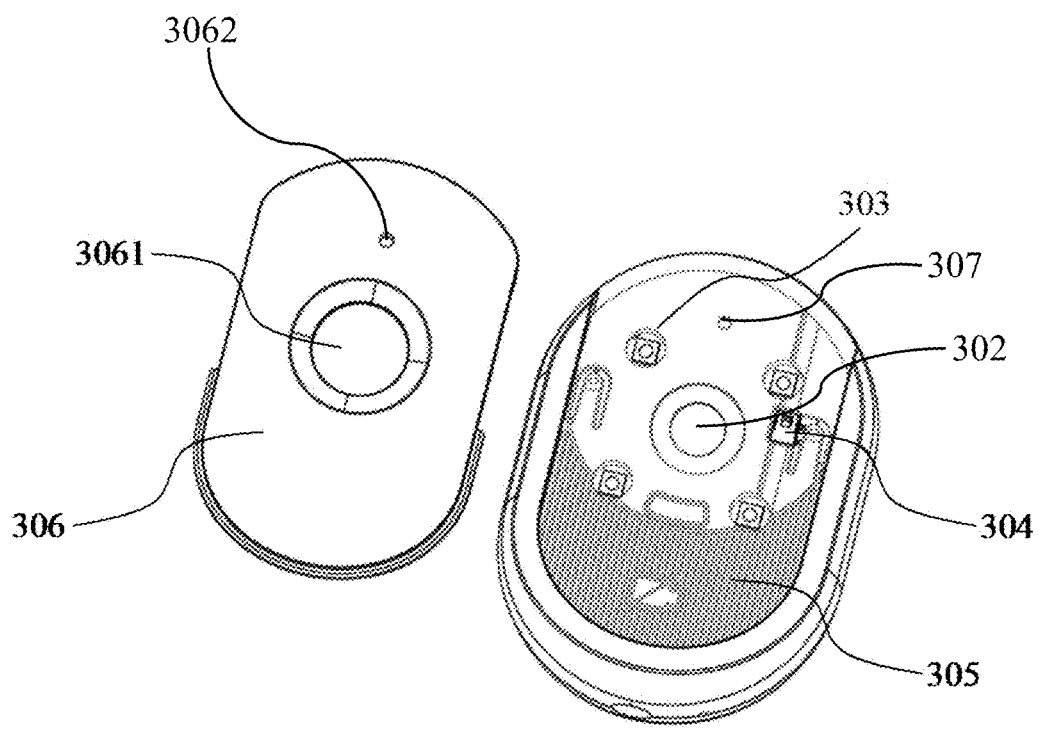
FIG. 3(C) is a perspective view of the camera of FIG. 3(A) where a baffle is separated from a housing.

FIG. 3 is a perspective view of a camera having a night vision mode according to the present disclosure, wherein (A) is a perspective view of the camera where a baffle is located at the bottom of a housing, (B) is a perspective view of the camera where a baffle is located at the top of a housing, and (C) is a perspective view of the camera where a baffle is separated from a housing.

As shown in FIG. 3, the camera 300 having a night vision mode comprises a housing 301, a lens 302, an audio capturing device (not shown in FIG. 3), at least one infrared LED 303, a main control circuit (not shown in FIG. 3), a switch 304, a panel 305 and a baffle 306.

The housing 301 has an opening, and the panel 305 is provided over the opening of the housing to cover the opening. Specifically, the shape and size of the panel 305 are the same as the shape and size of the opening of the housing 301, the periphery of the panel 305 is engaged with the side wall of the housing 301, and the upper surface of the panel 305 is flush with the edge of the opening of the housing 301, so that the upper surface of the panel 305 and the edge of the opening of the housing 301 are on the same plane. A cavity is formed between the panel 305 and the housing 301, and some components of the camera 300 may be provided in the cavity, for example, the lens, the audio capturing device, the main control circuit, etc. may be provided in the cavity.

The lens 302 is exposed from a substantially central position on the panel 305 and is configured to image an object within an imaging range of the camera 300 to acquire an image of the object.

The audio capturing device is provided in the cavity formed between the housing 301 and the panel 305 for capturing sound around the camera 300. The audio capturing device may be a microphone.

The at least one infrared LED 303 is provided around the lens 302 and is exposed from the panel 305. In (C) of FIG. 3, there are four infrared LEDs 303 provided at four vertices of a square with the lens 302 as a center point. The arrangement of the infrared LEDs above is merely an example, and the present disclosure is not limited thereto.

The at least one infrared LED 303 can emit infrared light in a night vision mode, and the emitted infrared light is received by the lens 302 after being reflected by an object within an imaging range of the camera 300, so as to form a black-and-white image of the object.

The main control circuit is provided in the cavity formed between the housing 301 and the panel 305 for controlling acquisition of the image by the lens 302, controlling capturing of the sound by the audio capturing device, and controlling light emission of the at least one infrared LED 303, etc.

The switch 304 is provided in the main control circuit for turning on or turning off the main control circuit. As shown in (C) of FIG. 3, the panel 305 is provided with an opening part, and the switch 304 is exposed from the opening part.

At the top of the panel 305, an indicator light 307 is provided for indicating a working state of the camera 300. If the indicator light 307 lights up, it is indicated that the camera 300 works normally, and if the indicator light 307 goes out, it is indicated that the camera stops working. The indicator light 307 is also controlled by the main control circuit. When the main control circuit is turned on, the indicator light 307 lights up, and when the main control circuit is turned off, the indicator light 307 goes out.

At the bottom of the panel 305, a camera icon 308 is provided, which may also be used for indicating the working state of the camera 300. If the camera icon 308 is exposed, it is indicated that the camera 300 stops working and enters a privacy protection mode, and if the camera icon 308 is blocked, it is indicated that the camera 300 works normally.

The baffle 306 is made of a black infrared transmitting material, and the shape and size of the baffle match that of the opening of the housing 301 and the panel 305. The baffle 306 is provided with a central opening 3061 at a substantially central portion, and the baffle 306 is provided with a through hole 3062 at the top. When the baffle 306 is engaged with the opening of the housing 301 to completely cover the opening of the housing 301, the lens 302 is exposed from the central opening 3061 of the baffle 306, and the indicator light 307 is exposed from the through hole 3062 at the top of the baffle 306.

The baffle 306 is movable over the opening of the housing 301 to cover or expose the opening of the housing 301.

A switch triggering component is provided on a face of the baffle 306 on which the baffle is engaged with the opening of the housing 301, and when the baffle 306 moves over the opening of the housing 301 to completely cover the opening, the switch triggering component triggers the switch 304 to turn on the main control circuit, and when the baffle 306 moves over the opening of the housing 301 to expose the opening of the housing 301 and block the lens 302, the switch triggering component triggers the switch 304 to turn off the main control circuit.

That is, as shown in (A) of FIG. 3, when the baffle 306 moves to the bottom of the housing 301, the switch triggering component triggers the switch 304 to turn on the main control circuit, at this time, the camera 300 works normally, and the main control circuit allows the lens 302 to acquire an image of an object within an imaging range of the camera 300, allows the audio capturing device to capture sound around the camera 300 and allows the at least one infrared LED 303 in a night vision mode to emit infrared light, the lens 302 is exposed from the central opening 3061 of the baffle 306, and the indicator light 307 which lights up is exposed from the through hole 3062 of the baffle 306 to indicate that the camera 300 works normally.

As shown in (B) of FIG. 3, when the baffle 306 moves to the top of the housing 301, the switch triggering component triggers the switch 304 to turn off the main control circuit, at this time, the lens 302 is prohibited from acquiring an image of an object within an imaging range of the camera 300, the audio capturing device is prohibited from capturing sound around the camera 300 and the at least one infrared LED 303 in a night vision mode is prohibited from emitting infrared light, the lens 302 is blocked by the baffle 306, and the indicator light 307 which goes out is exposed from the central opening 3061 of the baffle 306 to indicate that the camera 300 stops working, and enters a privacy protection mode.

Guide rails having sliding slots may be provided on two sides of the housing along the opening of the housing 301, and the baffle 306 is provided with flanges sliding along the sliding slots. The baffle 306 slides on the guide rails to cover or expose the opening of the housing 301.

Figure 4:
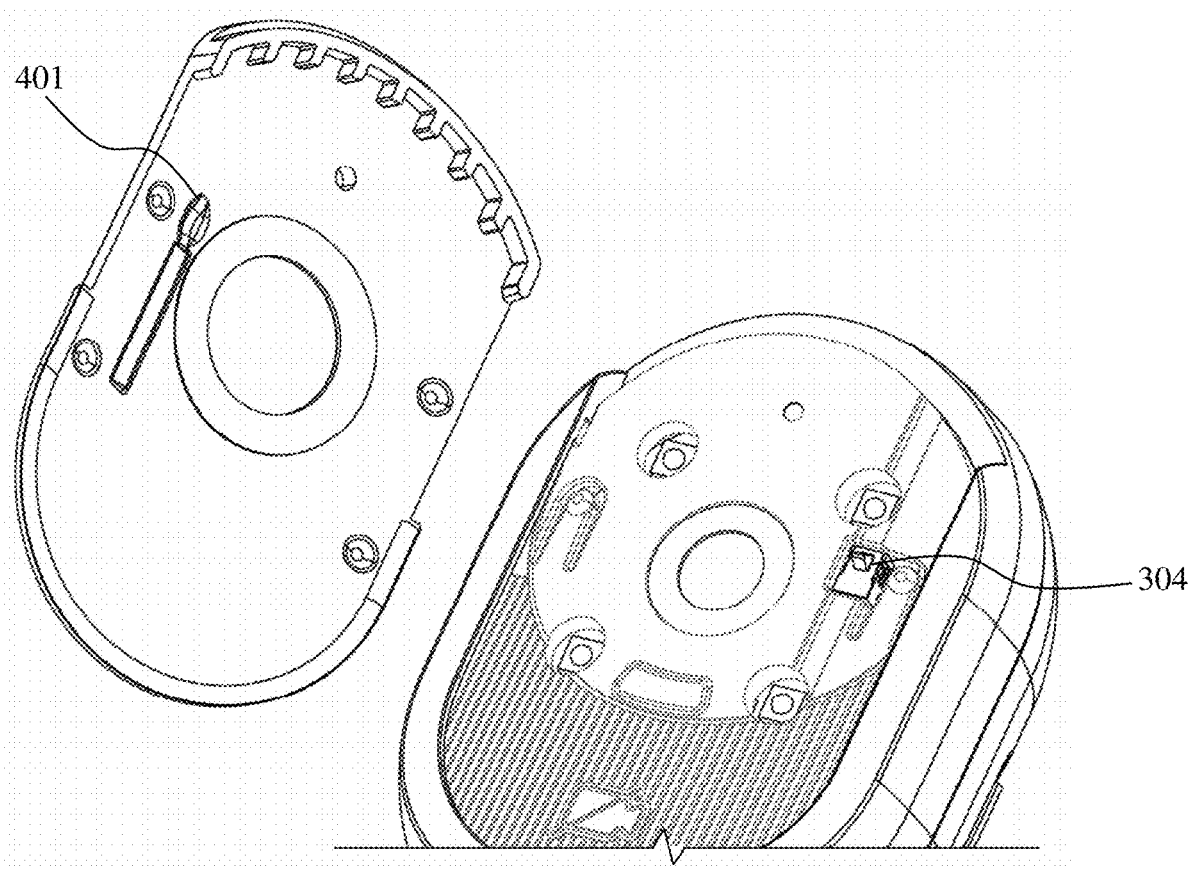
FIG. 4 shows specific configurations of a switch triggering component on the baffle and a switch in a main control circuit.

FIG. 4 shows specific configurations of a switch triggering component on the baffle and a switch in a main control circuit.

As shown in FIG. 4, the switch triggering component 401 is a recessed portion provided on the back of the baffle 306, and the switch 304 is a wedge-shaped protruding portion fitting the recessed portion. When the recessed portion is engaged with the protruding portion, the movement of the baffle may drive the switch 304 to move, so as to turn on or turn off the control circuit.

The switch triggering component and the switch of the present disclosure are not limited to the above configurations. For example, the switch triggering component of the present disclosure may be a magnet piece which is embedded in or attached to the baffle and has a suitable size and shape, the switch may be made of a material containing iron, and the magnet piece may control turning on or turning off of the switch by means of magnetic attraction.

According to the camera having a night vision mode of the present disclosure, when the baffle moves to the bottom of the housing of the camera, the switch triggering component of the baffle triggers the switch of the main control circuit to turn on the main control circuit, so that the camera is in a normal working state. When the baffle moves from the bottom of the camera to the top of the camera, the switch triggering component of the baffle triggers the switch of the main control circuit to turn off the main control circuit, and the lens, the audio capturing device and the infrared LED of the camera are all prohibited from working, thereby thoroughly enabling the camera to enter a privacy protection mode, and also avoiding the reduction of the lifespan of the infrared LED caused by unnecessary light emission. In addition, the baffle as a whole can transmit infrared light, which improves the aesthetic appearance of the camera.

In the camera 300 having a night vision mode of the present disclosure, the baffle is made of a black infrared transmitting material, and when the baffle moves from the bottom of the camera to the top of the camera, the lens of the camera is blocked by the black baffle, which gives the user a sense of safety as the lens is blocked visually.

In the camera 300 having a night vision mode of the present disclosure, the portion of the panel 305 which can be exposed from the baffle 306 may also be set to have a predetermined color, for example, a red-orange color or another color having a warning function. If the color is completely exposed from the baffle 306, it is indicated that the camera 300 stops working, and enters a privacy protection mode, and if the color is completely blocked by the baffle 306, it is indicated that the camera 300 works normally.

In this way, the working state of the camera can be easily determined on the basis of the indicator light 307, the color of the panel, the position of the baffle, etc.

In the above camera 300 having a night vision mode according to the present disclosure, when the baffle 306 moves over the opening of the housing 301 to completely cover the opening, the switch triggering component triggers the switch 304 to turn on the main control circuit, that is, when the baffle 306 is in the first position, the switch triggering component triggers the switch 304 to turn on the main control circuit. When the baffle 306 moves over the opening of the housing 301 to expose the opening of the housing 301 and block the lens 302, the switch triggering component triggers the switch 304 to turn off the main control circuit, that is, when the baffle 306 is in the second position, the switch triggering component triggers the switch 304 to turn off the main control circuit. The baffle 306 moves between the first position and the second position to control turning on and turning off of the main control circuit.

However, the present disclosure is not limited thereto, and the baffle 306 may move between the first position, the second position and the third position. In this case, when the baffle 306 is in the first position, the baffle 306 blocks the at least one infrared LED 303, the lens 302 is exposed from the central opening 3061 of the baffle 306, the switch triggering component 401 triggers the switch 304 to turn on the main control circuit, and the lens can receive visible or infrared light. When the baffle 306 is in the second position, the baffle 306 blocks the at least one infrared LED 303 and the lens 302, the main control circuit is still in a turned-on state, and at this time, the at least one infrared LED 303 emits infrared light, the emitted infrared light is transmitted through the baffle 306 to irradiate an object within an imaging range of the camera 300, infrared light reflected by the object is transmitted through the baffle 306 which blocks the lens 302 to be received by the lens 302 for imaging, so that the camera 300 enters a night vision mode. When the baffle 306 is in the third position, the baffle 306 blocks the at least one infrared LED 303 and the lens 302, and the switch triggering component 401 triggers the switch 304 to turn off the main control circuit, so that the camera 300 is enabled to be in an electrically turned-off state.

The baffle 306 may also be a slider mounted on the camera 300, and is slidable between the first position, the second position and the third position.

Although the at least one infrared LED 303 is exemplified as an infrared light emitting part which emits infrared light, the present disclosure is not limited thereto, and any device capable of emitting infrared light may be used as an infrared light emitting part.

In the foregoing embodiments of the present disclosure, each embodiment is described on the basis of respective emphasis, and for a part not described in detail in a certain embodiment, reference may be made to the relevant description of other embodiments.

Described above are only preferred embodiments of the present disclosure. It should be noted that, an ordinary skilled person in the art can also make a number of improvements and modifications without departing from the principle of the present disclosure, and these improvements and modifications should also be considered as within the scope of protection of the present disclosure.

What is claimed is:

1. An imaging device, comprising:
a main body, comprising a panel on a top side of the main body;
a lens housed in the top side of the main body and exposed from the panel and configured to perform imaging according to received light;
at least one infrared LED housed in the top side of the main body, being provided around the lens and exposed from the panel and configured to be capable of emitting infrared light to be used by the lens;
a control circuit configured to control imaging of the lens and light emission of the at least one infrared LED, wherein the lens is allowed to perform imaging when the control circuit is turned on, and the lens is prohibited from performing imaging when the control circuit is turned off, the at least one infrared LED is allowed to emit infrared light if the amount of visible light received by the lens is less than a predetermined value when the control circuit is turned on, and the at least one infrared LED is prohibited from emitting infrared light if the amount of visible light received by the lens is less than a predetermined value when the control circuit is turned off;
a switch provided in the control circuit and configured to turn on or turn off the control circuit; and
a baffle provided to cover at least a portion of the top side of the main body, the baffle being configured to move between a first position and a second position, wherein,
in the first position, the baffle is positioned to (1) expose the lens while allowing the transmission of the infrared light emitted from the at least one infrared LED and (2) trigger the switch to cause the switch to turn on the control circuit; and
in the second position, the baffle blocks the lens and triggers the switch to turn off the control circuit.

2. The imaging device according to claim 1, further comprising an audio acquisition device configured to acquire sound around the imaging device,
the control circuit is further configured to control the audio acquisition device to allow the audio acquisition device to acquire the sound when the control circuit is turned on, and prohibit the audio acquisition device from acquiring the sound when the control circuit is turned off, and
the control circuit allows the audio acquisition device to acquire the sound when the baffle is in the first position, and prohibits the audio acquisition device from acquiring the sound when the baffle is in the second position.

3. The imaging device according to claim 1, further comprising guide rails provided on two sides of the panel on the main body, and the baffle moves between the first position and the second position by means of the guide rails.

4. The imaging device according to claim 1, wherein the panel is provided with an indicator light for indicating a working state of the imaging device, the baffle is provided with a central opening at the central portion and is provided with a through hole at the top,
when the baffle is in the first position, the lens is exposed from the central opening of the baffle, and the indicator light is exposed from the through hole, and
when the baffle is in the second position, the indicator light is exposed from the central opening of the baffle.

5. The imaging device according to claim 1, wherein the panel is provided with an imaging device icon, and when the baffle is in the first position, the imaging device icon is blocked by the baffle, and when the baffle is in the second position, the imaging device icon is exposed to indicate that the imaging device stops working.

6. The imaging device according to claim 1, wherein the at least one infrared LED is configured to be capable of emitting infrared light if the amount of visible light received by the lens is less than a predetermined value.

7. A camera having a night vision mode, comprising
a housing having an opening,
a lens housed in the opening of the housing configured to acquire an image of an object within an imaging range of the camera;
at least one infrared LED housed in the opening of the housing close to the lens, the at least one infrared LED being configured to be capable of emitting infrared light in a night vision mode, the infrared light being received by the lens after being reflected by the object;
a main control circuit configured to control acquisition of the image by the lens and light emission of the at least one infrared LED;
a switch provided in the main control circuit and configured to turn on or turn off the main control circuit, so that the main control circuit allows the lens to acquire the image and allows the at least one infrared LED in a night vision mode to emit infrared light when the main control circuit is turned on, and prohibits the lens from acquiring the image and prohibits the at least one infrared LED in a night vision mode from emitting infrared light when the main control circuit is turned off;
and
a baffle made of an infrared transmitting material, engaged with the opening of the housing and movable over the opening of the housing to cover or expose the opening, wherein a switch triggering component is provided on a face of the baffle on which the baffle is engaged with the opening, and when the baffle moves over the opening of the housing to cover the opening and expose the lens, the switch triggering component triggers the switch to turn on the main control circuit, and when the baffle moves over the opening of the housing to expose the opening and block the lens, the switch triggering component triggers the switch to turn off the main control circuit,
wherein the housing is configured to accommodate the main control circuit and the switch.

8. The camera of claim 7, wherein the camera further comprises an audio capturing device configured to capture sound around the camera,
wherein the main control circuit is further configured to control capturing of the sound by the audio capturing device,
the main control circuit allows the audio capturing device to capture the sound when the main control circuit is turned on, and prohibits the audio capturing device from capturing the sound when the main control circuit is turned off, and
the audio capturing device is accommodated in the housing.

9. The camera of claim 7, wherein the camera further comprises a panel, the lens, the switch and the at least one infrared LED are exposed from the panel, the panel is provided with an indicator light, the indicator light is used for indicating a working state of the camera, and
the baffle is provided with a central opening at the central portion and is provided with a through hole at the top, and when the baffle moves over the opening of the housing to completely cover the opening of the housing, the lens is exposed from the central opening of the baffle, and the indicator light is exposed from the through hole.

10. The camera of claim 9, wherein the camera further comprises guide rails provided on two sides of the housing along the opening, and the baffle moving over the opening of the housing comprises: the baffle sliding along the guide rails over the opening of the housing.

11. The camera of claim 10, wherein the panel is provided with a camera icon, and when the baffle slides along the guide rails to block the lens, the switch triggering component triggers the switch to turn off the main control circuit, and the camera icon is exposed from the opening to indicate that the camera stops working.

12. The camera of claim 11, wherein the panel is yellow-orange or has another color having a warning function.

13. The camera of claim 7, wherein the switch has a protruding portion, the switch triggering component has a recessed portion fitting the protruding portion, and when the recessed portion is engaged with the protruding portion, the switch triggering component drives the switch to move along with the movement of the baffle, so as to turn on or turn off the main control circuit.

14. A camera having a night vision mode, comprising
a lens, an infrared emitting part configured to be capable of emitting infrared light to be used by the lens, and a switch triggering component; and
a baffle having an opening, the baffle being configured to move between a first position, a second position, and a third position,
wherein when the baffle is in the first position, the baffle covers the infrared emitting part, and the lens is exposed from the opening,
when the baffle is in the second position, the baffle covers the infrared emitting part and the lens, and when the baffle is in the third position, the baffle covers the infrared emitting part and the lens, and triggers the switch triggering component to enable the camera to be in an electrically turned-off state.

15. The camera of claim 14, wherein the infrared emitting part is at least one infrared LED, and the baffle is capable of transmitting infrared light.

16. The camera of claim 15, wherein the baffle is a slider mounted on the camera, and the slider is configured to slide between the first position, the second position and the third position.

17. The camera of claim 16, wherein when the baffle is in the first position, the lens is configured to receive visible or infrared light.

18. The camera of claim 16, wherein when the baffle is in the second position, the infrared emitting part emits infrared light, and the lens is configured to receive the reflected infrared light transmitted through the baffle, so that the camera enters a night vision mode.

* * * * *